A. AMESS.
ROLLER BEARING.
APPLICATION FILED APR. 10, 1916.
1,232,750.
Patented July 10, 1917.
2 SHEETS—SHEET 1.
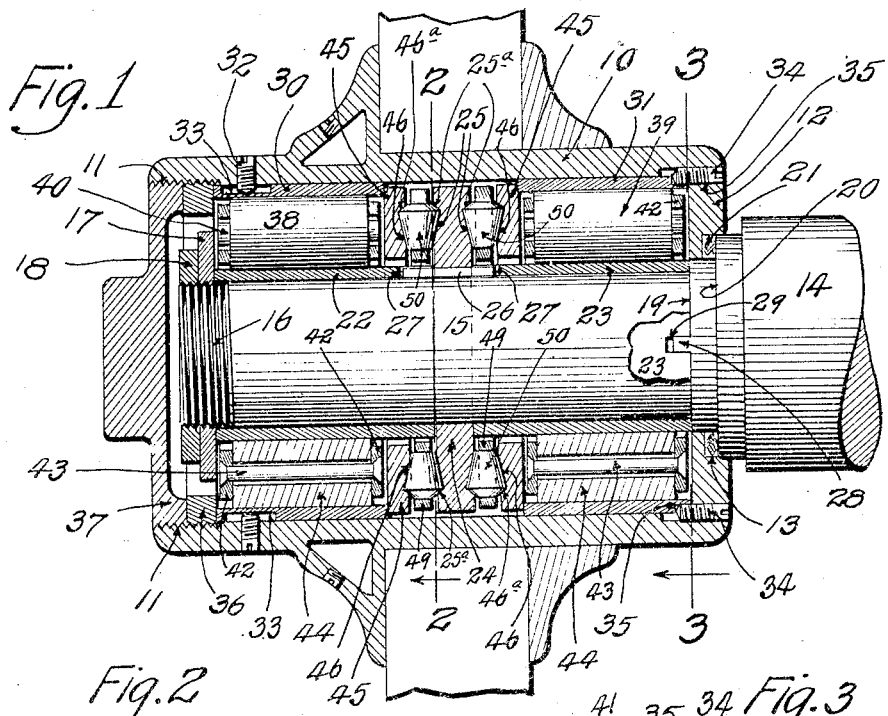
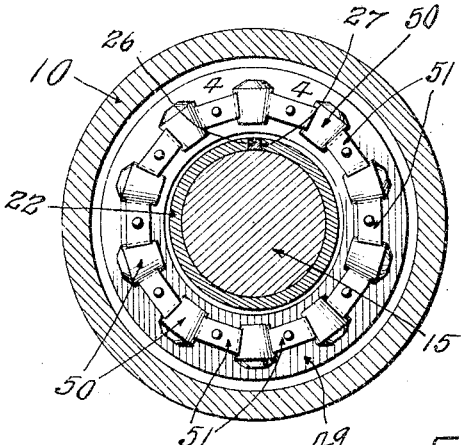
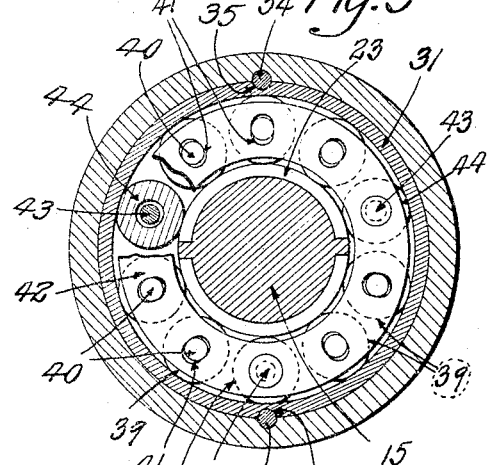
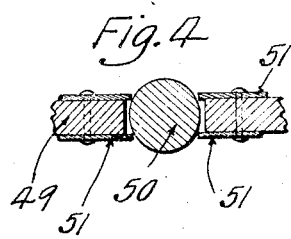
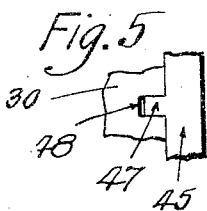
Inventor
Agness Amess
By [signature], Atty.

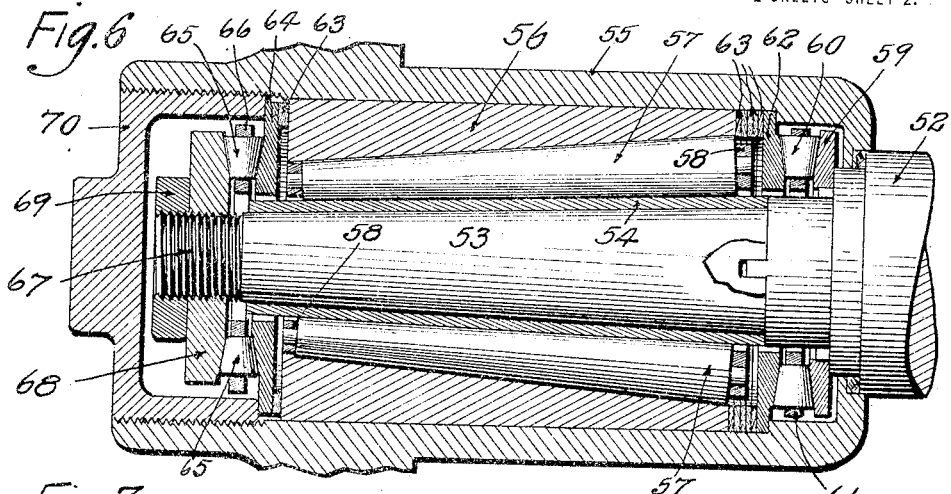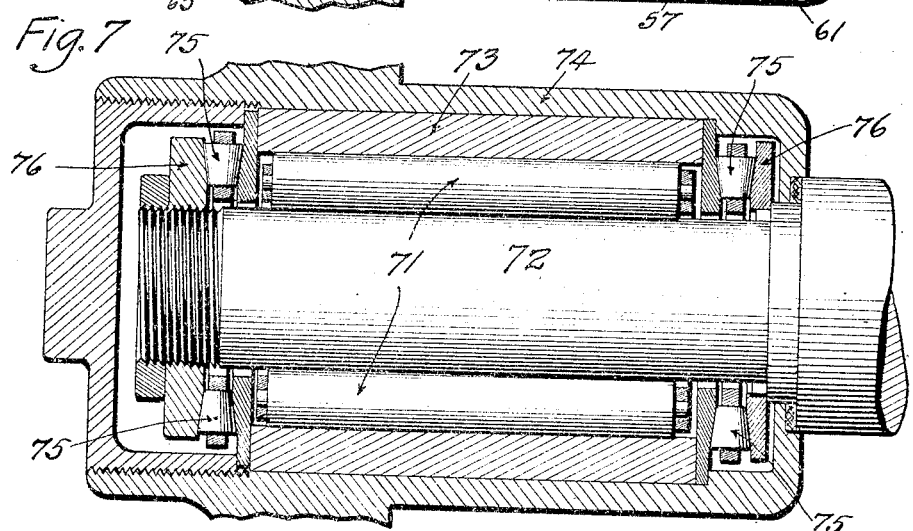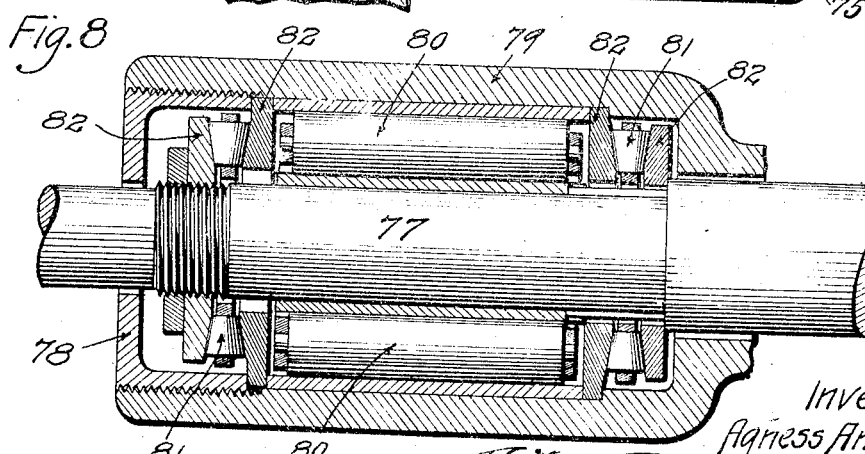

UNITED STATES PATENT OFFICE.

AGNESS AMESS, OF ST. LOUIS, MISSOURI.

ROLLER-BEARING.

1,232,750.  Specification of Letters Patent.  Patented July 10, 1917.

Application filed April 10, 1916. Serial No. 90,111.

*To all whom it may concern:*

Be it known that I, AGNESS AMESS, a citizen of the United States, residing at St. Louis, Missouri, have invented a certain new and useful Improvement in Roller-Bearings, of which the following is a full, clear, and exact description, such as will enable others skilled in the art to which it appertains to make and use the same, reference being had to the accompanying drawings, forming part of this specification.

My invention relates to a roller bearing for axles, shafts, spindles and the like, the principal object of my invention being to provide a comparatively simple and inexpensive roller bearing which can be readily adjusted to take up wear or lost motion and which bearing, in addition to being highly efficient in the reduction of friction between the coöperating parts, is designed so as to reduce to a minimum the friction resulting from end thrusts or side strains which may be developed between the parts with which the bearing is associated.

Further objects of my invention are to construct a roller bearing having a minimum number of parts, the same being arranged so as to be easily assembled or taken apart.

While my improved roller bearing is particularly designed for use in connection with the axles and differential shafts of motor vehicles, power boats, aeroplanes and the like, it will be readily understood that said bearing can be advantageously utilized in connection with all forms of machines and structures wherein shafts, axles and spindles are essential parts.

With the foregoing and other objects in view, my invention consists in certain novel features of construction and arrangement of parts, hereinafter more fully described, claimed and illustrated in the accompanying drawings, in which—

Figure 1 is a vertical section taken lengthwise through the center of a wheel hub and showing the same equipped with a roller bearing of my improved construction.

Fig. 2 is a cross sectional view taken approximately on the line 2—2 of Fig. 1.

Fig. 3 is a cross section taken approximately on the line 3—3 of Fig. 1.

Fig. 4 is an enlarged detail section taken approximately on the line 4—4 of Fig. 2.

Fig. 5 is a detail elevational view of a portion of one of the bearing rings and an adjustable bearing sleeve and showing the means utilized for locking said parts to each other.

Figs. 6, 7 and 8 are sectional views similar to Fig. 1 and illustrating various modified forms of my improved roller bearing.

In the construction of the bearing as illustrated in Figs. 1 to 5 inclusive, 10 designates a hollow cylindrical hub, one end of which is internally threaded as designated by 11 and the opposite end being provided with an inwardly projecting flange 12, and the inner edge of said flange is rabbeted as designated by 13.

The end of an axle 14 is reduced in diameter to form a spindle 15 which occupies a central position within the hub 10 and the outer end of said spindle is threaded as designated by 16 to receive a clamping nut 17 and a lock nut 18.

At the inner end of spindle 14 is formed a shoulder 19 and immediately adjacent thereto is a second shoulder 20 which fits snugly within the rabbet 13. Positioned within the space between this shoulder and rabbet is a packing ring 21, preferably of yielding compressible material.

Positioned on spindle 15 is a pair of hardened metal bearing sleeves 22 and 23 and interposed between said sleeves is a hardened metal ring 24, the same being provided with a pair of oppositely arranged inclined bearing faces 25 at the outer end of which is formed an abrupt shoulder 25ª. This ring is fixed to shaft 15 by means of a key 26, and the ends of said key extend into notches 27 formed in the adjacent ends of the sleeves 22 and 23. The outer end of sleeve 23 bears directly against shoulder 19 and formed integral with the axle and at the point where said shoulder is formed are two or more lugs 28 which project into corresponding notches 29 formed in the end of said sleeve 23. Thus sleeves 22 and 23 and bearing ring 24 are connected to the spindle so as to rotate therewith and said parts are held against longitudinal movement upon said spindle by clamping nut 17 which normally bears against the outer end of sleeve 22 and being so held by lock nut 18. (See Fig. 1.)

Positioned against the inner face of hub 10 and directly opposite the bearing sleeves 22 and 23 are hardened metal bearing sleeves 30 and 31. Sleeve 30 is connected to hub 10 so as to rotate therewith by screws 32 which are seated in the outer portion of said hub and enter longitudinally disposed slots 33, the same being formed in said sleeve. Sleeve 31 is connected to hub 10 so as to rotate therewith by set screws 34 which are seated in the inner end of said hub and enter notches 35 formed in the outer end of said sleeve.

Seated in the internally threaded outer end of the hub 10 is an adjusting ring 36, the same bearing directly against the outer end of sleeve 30 and bearing against this ring and serving as a lock therefor is a screw plate 37 which closes the outer end of the hub.

Interposed between the sleeves 22 and 30 is a series of hardened metal rollers 38 and positioned between sleeves 23 and 31 is a corresponding series of rollers 39. The rollers of both series are preferably solid and provided at their ends with trunnions 40 which are loosely mounted in short radially arranged slots 41, the latter being formed in rings 42. There is a pair of these rings for each series of rollers and the rings of each pair are connected by longitudinally disposed pins 43, the ends of which are rigidly fixed to said rings in any suitable manner.

Loosely mounted upon the pins 43 are hollow rollers 44, the same being formed of hardened metal and serving the same purpose as the rollers 38 and 39. Arranged adjacent to the inner ends of the two series of rollers 38 and 39 are hardened metal rings 45, the same being provided with inclined bearing faces 46 which are positioned directly opposite the inclined bearing faces 25 on ring 24 and at the outer ends of these bearing faces are formed shoulders 46ᵃ. These bearing rings 45 are held against rotary movement by means of lugs 47 which are formed integral with said rings and project laterally into corresponding notches 48, the latter being formed in the adjacent ends of sleeves 30 and 31. (See Fig. 5.)

The inclined faces 46 of rings 45 are oppositely disposed with respect to the corresponding faces 25 of ring 24, and thus annular spaces or chambers are formed between the bearing rings 25 and 45 and which spaces or chambers gradually taper in width toward the axis of the bearing. Loosely mounted within these annular chambers or spaces are rings 49 and loosely mounted in radially arranged openings therein are short truncated conical rollers 50, the peripheries of which bear against the inclined bearing faces 25 and 46, and the outer ends of which bear against the shoulders 25ᵃ and 46ᵃ. By providing these shoulders 25ᵃ and 46ᵃ, the tendency of the rollers to move radially outward under excessive strains is limited and the greater portion of such strains is relieved from the rings 49. These rollers 50 are held in position within the openings in said rings by means of thin metal plates 51 which are fixed in any suitable manner to the sides of rings 49 and with the ends of said plates projecting beyond the sides of the roller openings. (See Fig. 4.)

During the operation of the form of roller bearing just described, the hub revolves around spindle 15 and the two sets of rollers 38 and 39 bearing on the hardened metal sleeves 22, 23, 30 and 31 are effective in transmitting all radial strains from the hub to the spindle or vice versa, and likewise said rollers are instrumental in reducing to a minimum the friction between said parts.

All end thrusts or strains between the hub and axle are taken care of and the friction resulting from such end thrusts is reduced to a minimum by the hardened metal conical rollers 50 which bear on the inclined surfaces 25 and 46 of rings 24 and 45.

When it becomes necessary to adjust the position of rings 45 with respect to the rollers 50 for the purpose of taking up wear or lost motion which may develop after the bearing has been in service, cap plate 37 is removed and ring 36 is screwed inwardly, thereby moving sleeve 30 inwardly and consequently causing bearing ring 45 at the inner end of said sleeve to move into engagement with the adjacent rollers 50.

It will be understood that bearing ring 24 is fixed on spindle 15 so that after the position of the first one of the bearing rings 45 has been adjusted as just described, further movement imparted to ring 36 will tend to draw the hub outwardly upon the spindle with the result that sleeve 31 will cause the bearing rings 45 with which it is in engagement to move toward the adjacent rollers 50, and thus the lost motion due to wear or other causes will be taken up and the desired results accomplished.

It will be understood that by providing the slots 33 in which the inner ends of screws 32 engage that sleeve 30 can be adjusted lengthwise as just described and at the same time said sleeve will be held to revolve with the hub.

In the construction illustrated in Fig. 6, the axle 52 is provided with a tapered spindle 53 and upon which latter is mounted a hardened metal sleeve 54. Hub 55 is provided with an internally arranged hardened metal sleeve 56, the opening through which is tapered and interposed in the tapered annular space between sleeves 54 and 56 is a series of tapered rollers 57, the trunnions of which are journaled in rings 58.

Located at the inner end of the hub and bearing against a shoulder on the axle 52 is a ring 59 having an inclined bearing face against which engages the peripheries of a series of radially disposed truncated conical rollers 60. These rollers are carried by a ring 61 and arranged within the hub and bearing against an internal shoulder formed therein is a bearing ring 62, the same being positioned on the opposite sides of the rollers 60 from ring 59.

When this form of roller bearing is first positioned in the hub a number of comparatively thin washers 63 are positioned between ring 62 and the inner end of sleeve 56 and as wear takes place and lost motion develops, these washers are removed one at a time and positioned at the outer end of sleeve 56, thus permitting said last mentioned sleeve and the rollers 57 to be moved inwardly with respect to the hub 55 to compensate for the wear and which action in nowise changes the relative positions of the hub and axle.

In Fig. 6 a single one of these washers 63 is shown positioned at the outer end of sleeve 56. Bearing against this last mentioned washer is a hardened metal ring 64, against the outer face of which bears a series of truncated conical rollers 65, the same being carried by a ring 66.

The outer end of the tapered spindle 53 is threaded as designated by 67 and screw seated thereupon is a ring 68, the inner face of which bears against the rollers 65. Seated on the outer end of the threaded portion 67 of the spindle is a lock nut 69 and screwed into the outer end of hub 55 with its inner end normally bearing against the edge of ring 64 is a screw cap 70.

When screw cap 70 is tightened against ring 64, said ring, together with sleeve 56 and ring 62 will be locked to hub 55 and consequently will rotate therewith while rings 59 and 68 and sleeve 54 will rotate with the axle and spindle.

The rollers 57 take care of the radial loads or stresses between the spindle and hub and likewise reduce to a minimum the friction between said parts, and the rollers 60 and 65 take care of the end thrusts or strains and reduce to a minimum the friction incident thereto.

As hereinbefore stated, one of the washers 63 at the inner end of sleeve 56 can be transferred to the outer end of said sleeve when it is desired to take up wear or lost motion, thus slightly changing the position of the sleeve 56 with respect to the hub, but without changing the relative positions of the hub and axle.

When ring 68 is tightened upon the spindle, said ring, together with rings 64, 62 and 59 will be brought into bearing engagement with the rollers 60 and 65.

In the form of roller bearing illustrated in Fig. 7, a series of comparatively long cylindrical rollers 71 are interposed between the spindle 72 and an internal sleeve 73 carried by hub 74 and a series of truncated conical rollers 75 are arranged between pairs of bearing rings 76 between the ends of said rollers 71 and the ends of the hub. The outer one of the rings 76 is screw seated on the end of the spindle in order that the parts may be adjusted to take up any lost motion which may be developed through wear or other causes.

The form of device illustrated in Fig. 8 is particularly adapted for the differential shafts of a motor vehicle and this form of device is very similar to the form illustrated in Fig. 7, but with the exception that the shaft 77 is extended through an opening in a cap 78 which normally closes the outer end of hub or outer sleeve 79.

In this construction solid cylindrical rollers 80 are interposed between shaft 77 and sleeve 79 and truncated conical rollers 81 are arranged between hardened metal bearing plates 82 at the ends of said rollers 80.

A roller bearing of my improved construction is comparatively simple, can be easily assembled or taken apart, can be readily adjusted to take up wear and lost motion which may develop after continued use, reduces friction between a shaft or axle and its bearing to a minimum, and can be effectively used in various machines and structures and particularly where it is desired to eliminate friction resulting from end thrusts between the shaft or spindle and its coöperating sleeve or bearing.

It will be readily understood that minor changes in the size, form and construction of the various parts of my improved roller bearing can be made and substituted for those herein shown and described, without departing from the spirit of my invention, the scope of which is set forth in the appended claims.

I claim:

1. The combination with a shaft and sleeve, of a series of longitudinally extending rollers interposed between said shaft and sleeve, a pair of bearing rings arranged adjacent to an end of the series of rollers, one of said rings being held to rotate with the sleeve, a series of radially arranged rollers positioned between said bearing rings and a sleeve removably secured to the shaft, which sleeve forms a track for the longitudinally extending rollers, and serves as a securing means for the other of said rings.

2. The combination with a shaft and sleeve, of a series of longitudinally disposed rollers interposed between said shaft and sleeve, a pair of bearing rings arranged adjacent to an end of the series of rollers, one of said rings being held to rotate with the sleeve, a series of radially arranged rollers positioned between said bearing rings, a sleeve removably secured to the shaft, which sleeve forms a track for the longitudinally extending rollers, and serves as a securing means for the other of said rings, and means for adjusting one of said bearing rings toward the other.

3. The combination with a shaft and sleeve, of a series of longitudinally disposed rollers interposed between said shaft and sleeve, a pair of bearing rings arranged adjacent to an end of the series of rollers, one of said rings being held to rotate with the sleeve, a series of radially arranged rollers positioned between said bearing rings, a sleeve removably secured in the shaft, which sleeve forms a track for the longitudinally extending rollers and serves as a securing means for the other of said rings, means for adjusting one of said bearing rings toward the other, and means for locking the adjusted ring after movement.

In testimony whereof I hereunto affix my signature in the presence of two witnesses, this 6th day of April, 1916.

AGNESS AMESS.

Witnesses:
M. P. SMITH,
M. A. HANDEL.